Nov. 6, 1956  J. M. HAIT  2,769,521
FRUIT INSPECTING AND REJECTING MEANS
Filed March 5, 1952  3 Sheets-Sheet 3
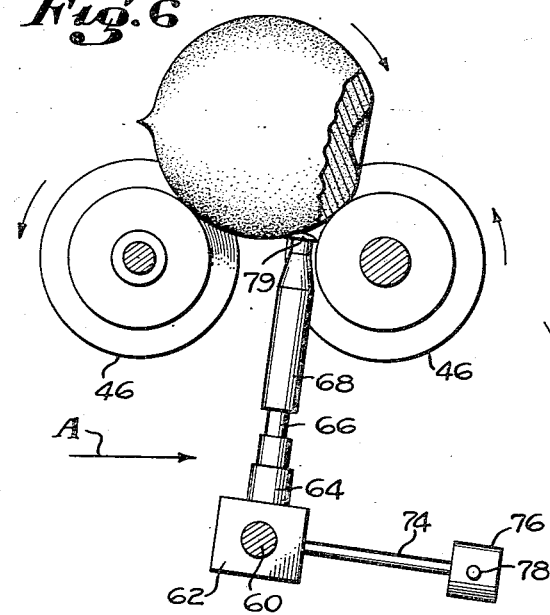
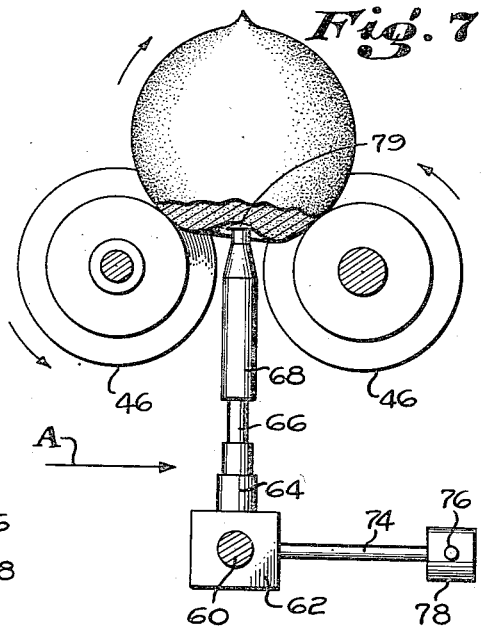
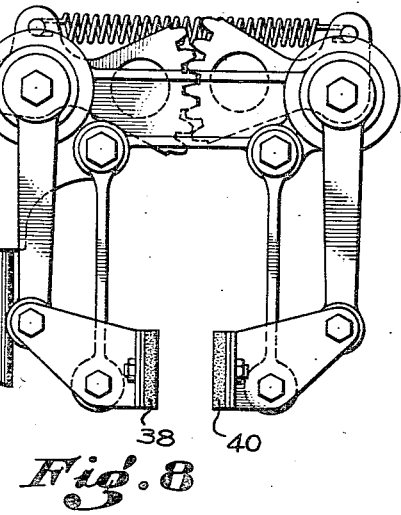
INVENTOR.
JAMES M. HAIT
BY
*Lyon & Lyon*
ATTORNEYS

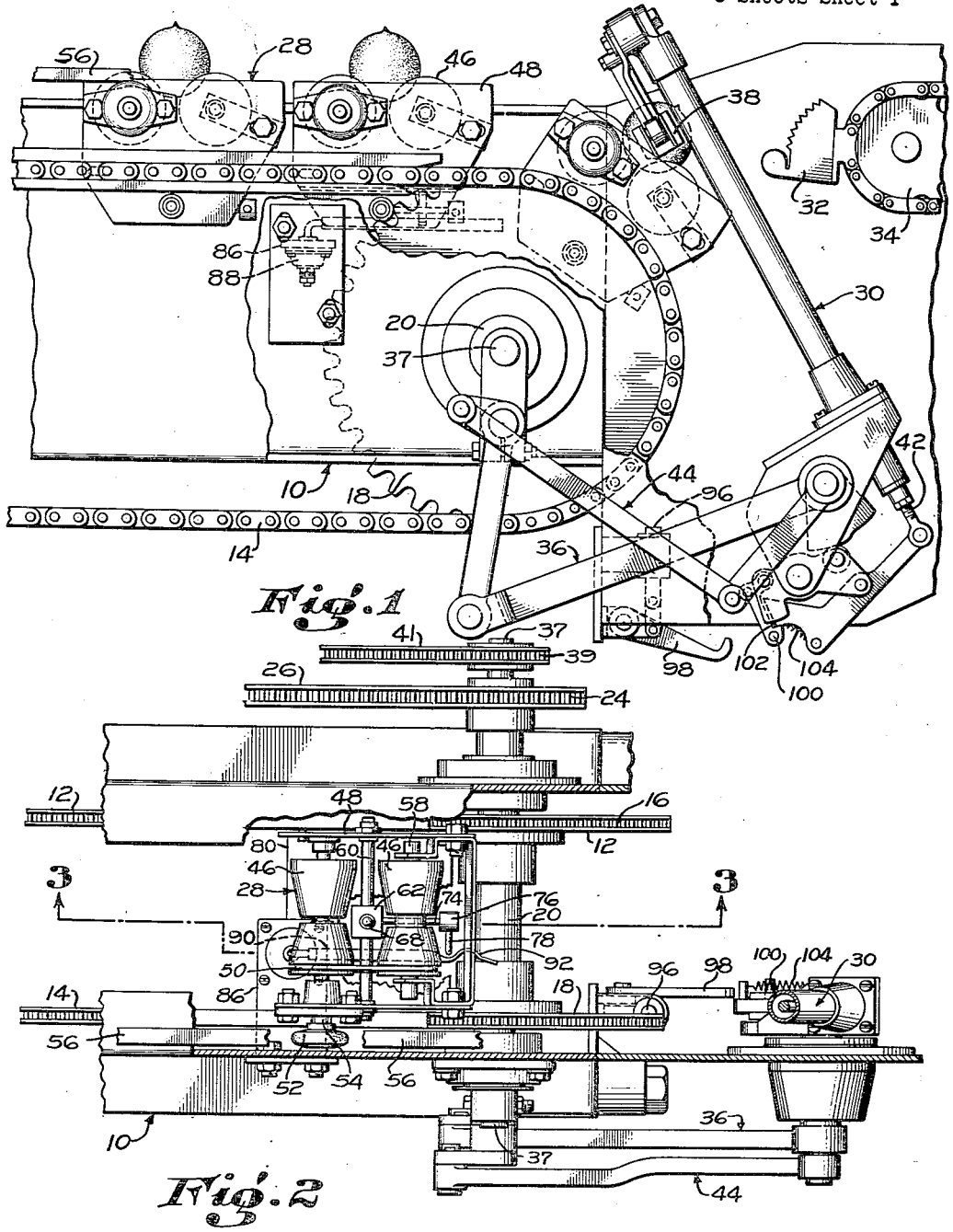

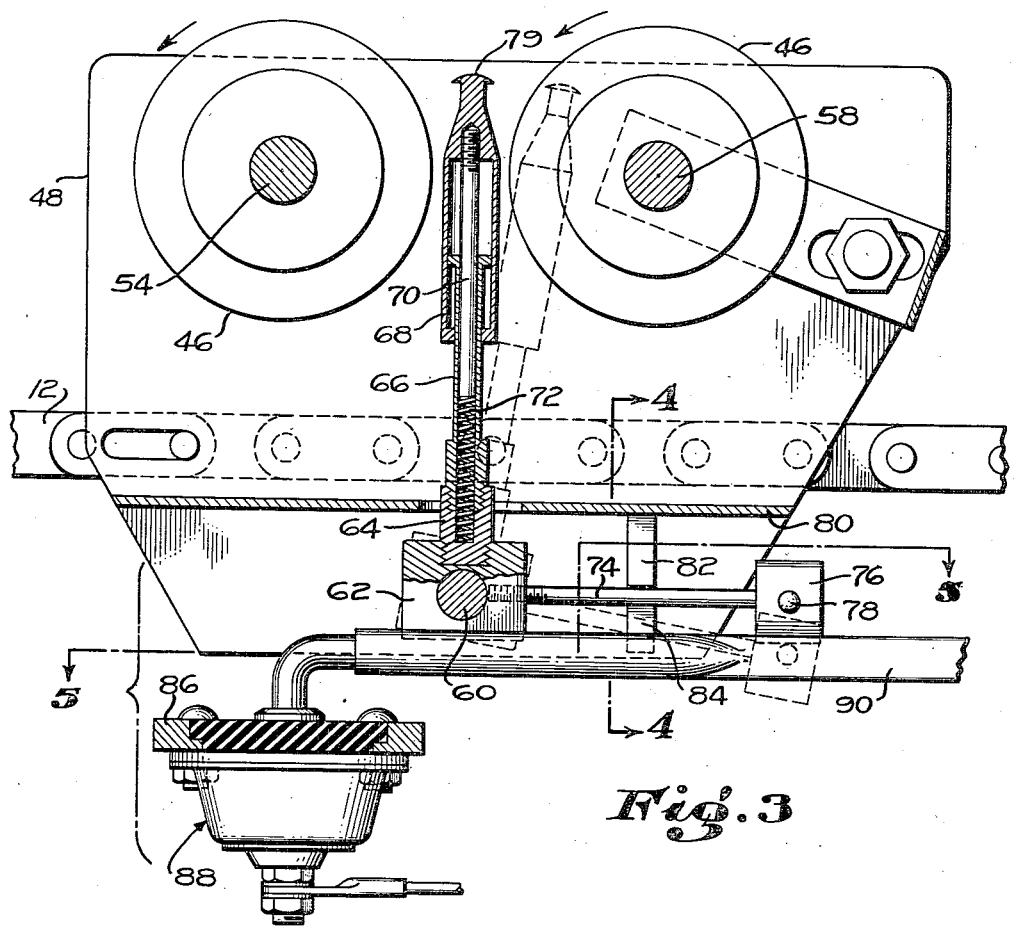
Fig. 3
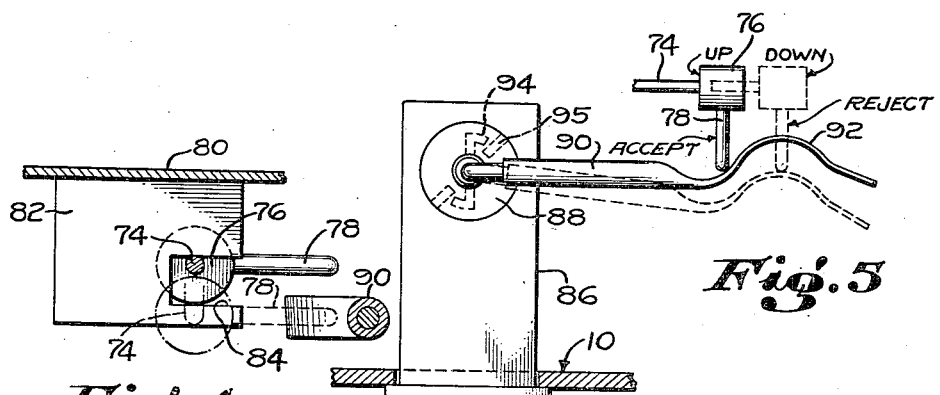
Fig. 4
Fig. 5
INVENTOR.
JAMES M. HAIT

United States Patent Office 2,769,521
Patented Nov. 6, 1956

2,769,521

FRUIT INSPECTING AND REJECTING MEANS

James M. Hait, San Jose, Calif., assignor, by mesne assignments, to Food Machinery and Chemical Corporation, San Jose, Calif., a corporation of Delaware Application March 5, 1952, Serial No. 274,917

5 Claims. (Cl. 198—33)

This invention relates to a fruit inspecting and rejecting device.

In referring to fruit I refer to indented fruit such as peaches, apricots and other similar or like fruit which has an indent, which indent has a major and minor diameter, one of which diameters serves as a reference for pitting or otherwise processing the fruit.

The device hereinafter described is particularly adapted to the feeding of peaches to a processing machine. However the adaptation of this invention is not limited to such a machine, nor are its features of novelty limited to this particular fruit or its processing.

There are several types of mechanisms adapted to orient a fruit and convey the oriented fruit to a processing machine. These mechanisms, when functioning properly, align the fruit with respect to a predetermined reference plane. However, a substantial percentage of the time these mechanical orienters fail to properly align the fruit with the result that it is improperly processed.

It is an object of this invention to provide means for inspecting the fruit during orientation and to determine if it is properly aligned for processing.

It is a further object of this invention to reject a fruit to avoid transfer to the processing machine when it is improperly aligned.

It is a further object of this invention to provide means for inspecting the alignment of a fruit without bruising or otherwise injuring the fruit or interfering with the travel of the fruit along a predetermined path.

Still a further object of this invention is to provide a fruit inspecting device which will compensate for the difference in size of the fruit inspected.

Other objects and advantages of this invention will be readily apparent from the following description:

In the drawings:

Figure 1 is a partial side elevation of a fruit orienting machine to which a fruit transferring means is attached and upon which a fruit inspecting device embodying this invention is mounted, certain parts being broken away;

Figure 2 is a partial plan view of the orienting machine and the fruit inspecting means, some parts being broken away;

Figure 3 is a section, taken along line 3—3 of Figure 2;

Figure 4 is a section, taken along line 4—4 of Figure 3;

Figure 5 is a section, taken along line 5—5 of Figure 3;

Figure 6 is a schematic partial side elevation of the inspecting device illustrating inspection of an improperly aligned fruit;

Figure 7 is a schematic partial side elevation of the inspecting device illustrating inspection of a properly aligned fruit; and Figure 8 is a fragmentary rear elevation of the fruit grasping portion of the fruit transferring means.

Referring now to Figures 1 and 2, the fruit orienting machine, generally designated 10, may be of any suitable type and is illustrated as similar to that described in my copending application Serial No. 169,042, filed June 19, 1950. In this machine spaced endless chains 12 and 14 pass about sprockets 16 and 18 which are mounted upon a hollow shaft 20. Corresponding sprockets are mounted upon a solid shaft (not shown) at the opposite end of the orienting machine and the chains 12 and 14 are trained therearound. The shaft 20 has also mounted thereon a third sprocket 24 which is driven by endless chain 26 which in turn is driven by a suitable source of power (not shown).

The endless chains 12 and 14 are spaced apart from one another, and supported between said chains and secured to corresponding links thereof are the orienting mechanisms generally designated 28. A plurality of these orienting mechanisms are spaced along the endless chains 12 and 14 and are carried by said endless chains from a fruit source, such as a hopper (not shown), which feeds a single fruit to each orienting mechanism, to the transfer means generally designated 30. During this travel the fruit is oriented, as more fully described in my copending application Serial No. 169,042. The fruit is then removed from the orienting mechanisms 28 which pass beneath sprockets 16 and 18 and return to the hopper and receive another fruit. It is prior to the removal of the fruit from the orienting mechanism that its alignment is inspected and if it is properly oriented it is lifted from the orienting mechanism.

The transfer means 30 may be of any suitable type and is herein illustrated as that described in my copending application Serial No. 273,415.

The transfer means 30 is caused to rock from the fruit receiving position seen in Figure 1 to the fruit releasing position where the fruit is delivered to an impaling blade 32 of a fruit processing machine, generally designated 34, by linkage 36 which is operated by rotation of a solid shaft 37 concentric with hollow shaft 20. The shaft 37 has mounted thereon a sprocket 39 which is driven in timed relation to the sprocket 24 by an endless chain 41 which in turn is driven by suitable means (not shown). The fruit processing machine may be of any type well known to those skilled in the art, one form of which is illustrated in the patent granted to Albert R. Thompson, No. 2,376,526, issued May 22, 1945, for a Continuous Peach Pitter. The fruit grasping means (see Figure 8) carried by transfer means 30 is described in my copending application Serial No. 273,415, in which fruit grasping jaws 38 and 40 are caused to close upon a fruit by a downward force upon operating rod 42. Linkage 44 is operated by the shaft 37 in timed relationship to linkage 36 to close the jaws 38 and 40 upon a fruit as the transfer means 30 is rocked, in timed relationship to the orienting mechanisms 28, to the foremost or fruit receiving position. The linkage 44 releases its downward force upon rod 42, releasing the grip of jaws 38 and 40 upon the fruit, when the transfer means 30 has rocked to its rearmost position, thus delivering the fruit to one of the impaling blades 32 which are driven in timed relation to shaft 37.

The orienting mechanism 28 illustrated is of the type having four frusto-conical rollers 46 spaced from one another so as to form a pocket therebetween, see Figure 2. These rollers are carried in a frame 48, which in turn is connected at each side to corresponding links of endless chains 12 and 14 and are operably connected to one another by belt 50. A roller 52 is mounted upon the extremity of shaft 54 upon which two of the rollers 46 are mounted and which shaft is rotatably mounted in frame 48. The roller 52 and the rollers 46 are caused to rotate counterclockwise, as seen in Figure 3, by the contact of roller 52 with the underside of an overhanging guideway 56, see Figure 2, which rotation is imparted to the other pair of rollers 46, mounted upon rotatable shaft 58, by means of endless belt 50. Thus the counterclockwise rotation of rollers 46, see Figure 6, while the orienting mechanism is carried along the orienting path by endless chains 12 and 14 in the direction of the arrow A, imparts a clockwise rotation to a fruit supported in the pocket formed between said rollers 46 (see Figure 6).

Rotatably mounted between opposed sides of frame 48, and normal to the direction of movement of the orienting mechanism 28, is a shaft 60. This shaft 60 has mounted thereon, immediately below the center of the pocket formed between rollers 46, a block 62 which has a threaded recess adapted to receive nipple 64 which in turn receives a threaded extremity of the hollow tube 66 (see Figure 3). Mounted on the flanged extremity of tube 66 is a finder 68 which has an internal plunger 70 adapted to fit within the hollow tube 66. A spring 72 retained in said hollow tube urges said plunger 70 and hence said finder upwardly into contact with a fruit supported in the pocket formed between rollers 46. Secured to the block 62 is a rod 74 projecting in the direction of travel of the orienting mechanism 28 having a block 76 secured to the forward extremity of said rod. The block 76 has a contact arm 78 projecting therefrom toward one side of frame 48 of the orienting mechanism.

The bottom plate 80 of the frame 48 of the orienting mechanism 28 is provided with an aperture through which the hollow tube 66 projects (see Figure 3), while block 62, rod 74 and contact arm 78 are below this plate. Depending from plate 80 is a slotted stop member 82. Rod 74 passes through the slot 84 in the stop member and the rotation in either direction of the rod 74 is thus limited.

The finder 68 is normally tilted rearwardly, as shown by the dotted lines in Figure 3, because of the clockwise moment exerted by block 76. The rearward tilting of the finder 68 is limited by the contact between the lower side of the slot 84 and the rod 74. When the fruit is misaligned, that is, when the finder has not located the calyx indent, said fruit continues to rotate in a clockwise direction and finder 68 remains in its normal rearwardly pivoted position, represented by dotted lines in Figure 3, since the friction between the clockwise rotating fruit and the rounded head 79 of the finder 68 is not sufficient to overcome the moment exerted upon the shaft 60 by the block 76. When, however, the finder has located the indent, as seen in Figure 7, the clockwise rotation of the fruit causes the finder 68 to be rotated counterclockwise until it stands substantially vertically with the finder 68 projecting into the calyx indent, further rotation of the fruit and finder 68 being arrested by the abutment of the rod 74 and the upper side of the slot 84. Continued counterclockwise rotation of the rollers 46, whereby the fruit is continually urged to rotate clockwise, maintains the finder 68 in this substantially vertical condition against the moment exerted by the block 76.

Suitably secured to the frame of orienting machine 10, beneath the path of the orienting mechanisms, is support plate 86 (Figures 3 and 5) having switch 88 attached to the underside thereof. Projecting upwardly from the switch 88 and then along the direction of travel of the orienting mechanisms 28 is switch actuating arm 90 resiliently mounted to normally assume the full line position shown in Figure 5. This switch actuating arm is located below the level which the contact arm 78 assumes when a fruit is properly oriented and the finder 68 is substantially vertical. Thus when a fruit is properly oriented, the orienting mechanism passes by the switch actuating arm without the contact arm 78 engaging said actuating arm 90. When a fruit is improperly aligned, however, the finder 68 remains in its rearwardly tilted position where arm 74 strikes the lower extremity of the slot 84 in the stop member 82. At this lowered position the contact arm 78 will engage and rotate the actuating arm 90 as the carriage with the arm 78 mounted on it is moved along the orienting path by chains 12 and 14.

It is desirable to form the actuating arm with a curved lateral offset 92 and to adjust the length of the contact arm 78 so that it will contact the lateral offset as it passes when a fruit is misaligned. This contact pivots the actuating arm 90 clockwise into the position indicated by dotted lines in Figure 5, causing the contacts 94 to engage the contact points 95, closing switch 88. After the pin 78 is carried past the arm 90, the resilient mounting of said arm 90 urges it back into the full line position indicated in Figure 5.

The closing of switch 88 completes a suitable time delay circuit (not shown) which energizes solenoid 96 at the time the transfer means 30 rocks counterclockwise toward a position over the inspected misaligned fruit. Energization of solenoid 96 raises the claw 98 upwardly into a position where it engages pin 100, tripping the latch means 102 and preventing the application of any downward force upon operating rod 42 (see Figure 1). When this downward force caused by linkage 44 is not exerted upon operating rod 42, the jaws 38 and 40 fail to close upon the fruit carried by the orienting mechanism 28 and the fruit falls into a suitable receptacle as the orienting mechanism passes over sprockets 16 and 18 rather than being transferred to the processing machine 34. The operation of the latch means and remainder of the transfer means is fully described in my copending application Serial No. 273,415.

The operation of this invention is as follows: A fruit is fed to an orienting mechanism 28 from a suitable source. The rollers 46 form a pocket to receive the fruit and these rollers are caused to rotate, thus rotating the fruit. The spring loaded finder 68 is rotated clockwise by the weighted rod 74 which rests on the lower edge of slot 84 when the fruit is improperly aligned so that contact arm 78 is in a lowered position. As the orienting mechanism passes the stationary switch 88 and its actuating arm 90, the contact arm 78 will strike the curved lateral offset 92, rotating the resiliently mounted actuating arm 90 closing switch 88. The closing of this switch energizes an electrical memory device (not shown) which actuates the solenoid 96 raising claw 98 into the path of pin 100 as the transfer means 30 rocks from the fruit releasing position toward the fruit receiving position and as a carriage 28 carrying the misaligned fruit approaches the fruit transfer station. This trips latch means 102, preventing jaws 38 and 40 from closing upon the fruit. The solenoid 96 is de-energized by means (not shown) after the transfer means 30 rotates clockwise toward the fruit processing machine 34. The claw 98 is thus lowered and spring 104 engages the latch means again so that the transfer means 30 will function to transfer the next fruit to the processing machine.

In the event that the fruit is properly aligned by the time the orienting mechanism reaches the inspection station, the finder 68 has located the calyx indent and has been pivoted to a substantially vertical position by the driving force of the rotating rollers 46 on the fruit so that the path of contact arm 78 is raised above the level of the actuating arm 90 so that said arms do not contact. Subsequently, when the carriage 28 arrives at the transfer station the linkage 44 causes the jaws 38 and 40 to close upon the fruit and linkage 36 rocks the transfer means 30, delivering the fruit to one of the impaling blades 32 of the fruit processing machine 34.

While what hereinbefore has been described is the preferred embodiment of this invention, it is readily apparent that various modifications can be resorted to without departing from the scope of this invention, which modifications are intended to be within the scope of the following claims.

I claim:

1. In a fruit orienting device of the class moving along an orienting path and having a pivotally mounted calyx indent finder and means for rotating a fruit during travel along said orienting path permitting said finder to locate the calyx indent of the fruit, the combination with said finder of a stationary switch, a switch actuating arm having a curved lateral offset formed thereon, and a contact arm carried by said finder adapted to contact said lateral offset and actuate said switch when said finder is pivoted away from a position normal to said orienting path.

2. In a continuously moving fruit orienting device, the combination of a plurality of rollers forming a pocket adapted to receive an indented fruit, means imparting rotation to said rollers rotating said fruit, a finder positioned in said pocket to engage the surface of the fruit, means for supporting said finder to permit said finder to rotate through an arc when said finder locates and passes into the calyx indent of said fruit, switch means, switch actuating means adjacent the path of said orienting device, and contact means carried by said finder which will contact said switch actuating means actuating said switch when said finder has failed to locate said calyx indent.

3. In a continuously moving fruit orienting device, the combination of a plurality of rollers forming a pocket adapted to receive an indented fruit, means imparting rotation to said rollers rotating said fruit, a finder positioned in said pocket to engage the surface of the fruit, means for supporting said finder to permit said finder to rotate through an arc when said finder locates and passes into the calyx indent of said fruit, switch means, switch actuating means adjacent the path of said orienting device, contact means carried by said finder which will contact said switch actuating means actuating said switch when said finder has failed to locate said calyx indent, and stop means limiting the arc through which said finder may rotate.

4. In a continuously moving fruit orienting device, the combination of a plurality of rollers forming a pocket adapted to receive an indented fruit, means imparting rotation to said rollers rotating said fruit, a finder positioned in said pocket to engage the surface of the fruit, means for supporting said finder to permit said finder to rotate through an arc when said finder locates and passes into the calyx indent of said fruit, switch means, a switch actuating arm having a lateral offset thereon positioned adjacent the path of said orienting device, and a contact arm carried by said finder to contact said lateral offset and close said switch when said finder has failed to locate said calyx indent.

5. In a continuously moving fruit orienting device, the combination of a plurality of rollers forming a pocket therebetween adapted to receive an indented fruit, means for driving said rollers thereby rotating said fruit, a finder positioned in said pocket to engage the surface of the fruit, means for supporting said finder to permit the same to rotate through an arc when said finder locates and passes into said calyx indent, stop means limiting rotation of said finder to a substantially vertical position when the calyx indent is located, a switch, a switch actuating arm adjacent the path of said orienting device, and a contact arm carried by said finder to contact said actuating arm and close said switch when the finder has failed to locate said calyx indent and failed to rotate to said substantially vertical position.

References Cited in the file of this patent
UNITED STATES PATENTS

| | | |
|---|---|---|
| 2,232,210 | Carroll | Feb. 18, 1941 |
| 2,254,594 | Carroll | Sept. 2, 1941 |
| 2,568,947 | Carroll | Sept. 25, 1951 |